June 17, 1930. J. E. BELL 1,764,190
OIL VAPOR SEPARATION AND CONDENSATION
Filed Aug. 27, 1924
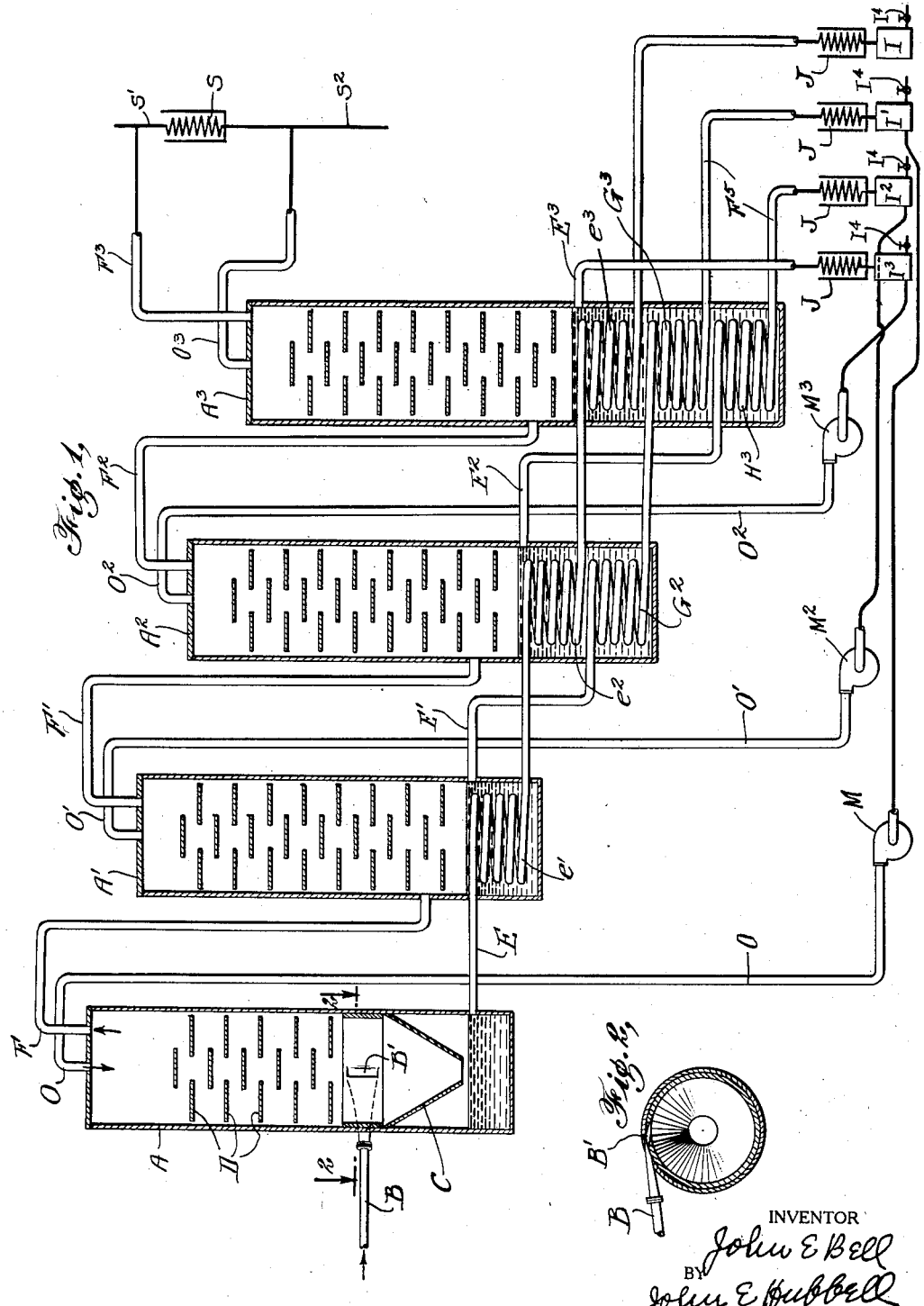

Patented June 17, 1930

1,764,190

UNITED STATES PATENT OFFICE

JOHN E. BELL, OF BROOKLYN, NEW YORK, ASSIGNOR TO FOSTER WHEELER CORPORATION, OF NEW YORK, N. Y., A CORPORATION OF NEW YORK

OIL-VAPOR SEPARATION AND CONDENSATION

Application filed August 27, 1924. Serial No. 734,384.

The general object of the present invention is to provide an improved method of and improved means for separating the oil and oil vapors coming from an oil heater and separating condensed fractions of the oil vapors which were especially devised and are especially adapted for use in refining petroleum oils.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the intion.

Of the drawings:

Fig. 1 is a somewhat diagrammatic representation; and

Fig. 2 is a section on the line 2—2 of Fig. 1.

In the drawings A represents a primary separator in the form of a tank or tower into which the oil and vapor mixture coming from the heater through a pipe B is discharged through a tangential tank inlet B', so that an initial separating action is obtained which is analogous in character to the operation of a so-called cyclone separator. The unvaporized oil travels along a spiral path along the inner surface of a conical baffle member C located in the tank A below the inlet B', and passes through the open lower and smaller end of the conical member C into a body of liquid in the bottom of the tank A. E represents a normally submerger overflow outlet for the oil accumulating in the bottom of the tank A. The vapors separating from the oil in tank A ascend to a vapor outlet F, and as they ascend are scrubbed by down flowing condensate and reflux liquid supplied to the top of the separator A by a conduit O, this scrubbing action being augmented by baffles D or the like which serve to retard and break up the streams of ascending vapor and descending liquid.

The vapor outlet pipe F from the primary separator A leads to a separator A', opening to the latter adjacent its lower end but above the liquid level therein which is fixed by the location of the normally submerged liquid overflow outlet pipe E'. At its upper end the separator A' is provided with a vapor outlet F' and an inlet O' for reflux liquid. Located in the upper portion of the separator A' are baffles for breaking up and retarding the upflowing vapors and the downflowing condensate and reflux liquid. Located in the lower portion of the separator A' is a pipe coil $e'$, through which is passed the liquid discharged from the primary separator A through the pipe E.

The vapor pipe F' is connected to a third separator $A^2$ which may be identical in construction and arrangement with the separator A' except that the liquid level in the separator $A^2$ may be relatively higher than in A' so as to provide a depth of the liquid in the separator $A^2$ sufficient to immerse pipe coils $e^2$ and $G^2$. The coil $e^2$ receives the liquid passing through the coil $e'$ and the second coil $G^2$ receives the liquid overflowing through the outlet pipe E' from the separator A'. The vapor outlet $F^2$ from the separator $A^2$ is connected to a fourth separator $A^3$ which may be exactly like the separators A' and $A^2$, except that the liquid outlet $E^3$ from the separator $A^3$ is located at such height that pipe coils $e^3$, $G^3$, and $H^3$ may be submerged in the liquid in the separator $A^3$. The coil $e^3$ receives oil from the coil $e^2$, the coil $G^3$ receives liquid from the coil $G^2$, and the coil $H^3$ receives the liquid discharge from the separator $A^2$ through the pipe $E^2$. The vapor outlet $F^3$ from the separator $A^3$ is connected to a condenser S with an outlet S' for permanent gases and an outlet $S^2$ for condensate and a connection $O^3$ for returning some of the condensate to the top of the separator $A^3$ for reflux purposes.

The oil withdrawn from the separator A through the pipe E passes successively through the pipe coils $e'$, $e^2$, and $e^3$, and passes from the latter through a suitable cooler J into a receiving tank I. Similarly the oil passing out of the separator A' through the pipe E' and thence through the coils $G^2$ and $G^3$ is discharged through a cooler J into a receiving tank I'. The oil passing out of the separator A² through the pipe E² after passing through the pipe coil H³ is passed through a cooler J into a receiving tank I², and the oil withdrawn from the separator A³ through the pipe E³ is passed through a cooler J into a receiving tank I³. Each of the receiving tanks I, I', I², and I³ is provided with a valved outlet I⁴ through which the oil therein collected may be withdrawn to other storage provisions or for utilization. In addition the reflux liquid supplied to the top of the separator A is drawn from the receiver I' by a circulating pump M, and similarly the reflux liquid supplied by the pipes O' and O² to the upper ends of the separators A' and A², respectively, is drawn by circulating pumps M² and M³ from the receiving tanks I² and I³, respectively.

In the operation of the apparatus illustrated successively lower temperatures will prevail in the separators A, A', A² and A³ and the condensates collecting in the lower ends of these chambers will have successively lower boiling points and will be at successively lower temperatures. The fact that the reflux liquid supplied to each separator consists of condensate formed in the adjacent separator of the series in which the next lowest temperature is maintained contributes to the maintenance of a desirably clean demarcation between the oil fractions thus separated. The production of clean cut fractions is materially aided also by the fact that the liquid collecting in the lower end of each of the separators beyond the primary separator A is subjected to a reboiling action by the flow of the liquid through the pipe coils submerged in the body of liquid in the lower portion of the separator and through which all of the oil collecting in the lower portions of the prior separator or separators in the series is passed. The submerged coils e, e², G², etc. serve therefore to heat the condensate in which they are submerged while at the same time cooling the oil passing through them. This reduces the duty of the final coolers J and stabilizes the temperatures maintained in the various separators as well as contributing to the separation of the condensate into the clean cut fractions. It will be obvious of course that the number of separators A, A', A², etc., in the series may be varied as conditions may require.

The tanks A', A² and A³ which I have called separators, operate in effect as air cooled condensers and need not be lagged, and the apparatus as a whole is characterized by its simplicity and reliability and relatively low cost of construction, maintenance and operation as well as by its effectiveness.

While in accordance with the provisions of the statutes I have illustrated and described the best form of the embodiment of my invention now known to me, it will be apparent to those skilled in the art that formal departures may be made in the apparatus and methods specifically illustrated and described without departing from the spirit of my invention as set forth in the appended claims and that certain features of my invention may sometimes be used with advantage without a corresponding use of other features.

Having now described my invention what I claim as new and desire to secure by Letters Patent is:

1. The method of fractionally condensing vapors by lowering the temperature of the uncondensed vapors in successive stages, collecting condensate and reflux liquid in each stage and utilizing the liquid so collected in each earlier stage to supply heat for reboiling the liquid so collected in each of the later stages whereby the liquid collected in the earlier stages is cooled, and returning to each earlier stage for reflux purposes a portion of the cooled liquid collected in the immediately subsequent stage.

2. In combination, a series of condensers each comprising a condensing chamber with a vapor inlet, a vapor outlet and a liquid outlet arranged to maintain a body of liquid in the chamber, a connection from the vapor outlet of each earlier chamber in the series of the vapor inlet of the succeeding chamber, a reboiler in each later chamber of the series in contact with the liquid body there, and a connection from the liquid outlet of each earlier chamber to the reboiler of each of the subsequent chambers.

3. In oil refining apparatus, a series of condensers each comprising a condensing chamber with a vapor inlet, a vapor outlet and a liquid outlet arranged to maintain a body of liquid in the chamber, said liquid outlets being arranged to provide bodies of liquid increasing in amount, in successive chambers, a connection from the vapor outlet of each earlier chamber of the series to the vapor inlet of the succeeding chamber, a reboiler in each later chamber of the series in contact with the liquid body therein, a connection from the liquid outlet of each earlier chamber to the reboiler of each of the subsequent chambers, and means for supplying to each earlier chamber in the series reflux liquid passed from the immediate subsequent chamber through the subsequent reboilers.

4. In an oil refining system, the combination with an oil and vapor separating chamber, of a plurality of condenser chambers, connections between said condenser chambers and said separating chamber for series flow of uncondensed vapors from said separating chamber in series through said condenser chambers, each of said chambers having a vapor outlet at its upper end, an oil outlet adjacent its lower end adapted to maintain a body of oil in the bottom of said chamber, an inlet adjacent the lower end of the chamber but above the liquid level therein, and baffles for retarding the flow of vapor in each chamber toward the vapor outlet thereof and for subjecting the vapor to contact with down flowing condensate and reflux liquid, reboilers in contact with the bodies of liquid in the condensing chambers, and a connection to a reboiler in each condenser chamber from the liquid outlet of each of the preceding chambers in the series.

5. In an oil refining system, the combination with an oil and vapor separating chamber, of a plurality of condenser chambers, connections between said condenser chamber and said separating chamber for series flow of uncondensed vapors from said separating chamber in series through said condenser chambers, each of said chambers having a vapor outlet at its upper end, an oil outlet adjacent its lower end adapted to maintain a body of oil in the bottom of said chamber, an inlet adjacent the lower end of the chamber but above the liquid level therein, and baffles for retarding the flow of vapor in each chamber toward the vapor outlet thereof and for subjecting the vapor to contact with down flowing condensate and reflux liquid, reboilers in contact with the bodies of liquid in the condensing chambers, a connection to a reboiler in each condenser chamber from the liquid outlet of each of the preceding chambers in the series, and means for supplying to the upper end of each of the earlier chambers in the series for reflux purposes, liquid which has passed through the liquid outlet of the immediately subsequent chamber in the series and through the subsequent reboilers.

6. Oil refining apparatus comprising a series of condensers each of which consists of a condensing chamber having a vapor inlet, a vapor outlet at the top of said chamber and a liquid outlet arranged to maintain a body of liquid in said chamber, a connection from the vapor outlet of each earlier chamber in the series to the vapor inlet of the succeeding chamber, and means in each of said later chambers of the series connected to the liquid outlets of each of the earlier chambers for heating the liquid bodies in said later chambers, said liquid outlets in each of said later chambers being arranged at increasing heights above the bottom of said liquid holding space.

7. The method of fractionally condensing vapors which consists in treating the vapors in successive stages at successively lower temperatures, separately recovering condensates formed in the successive stages, and utilizing available heat in the condensate obtained in the earlier stages to reboil the condensate formed in later stages by separately passing the condensate in each earlier stage through the condensate in a plurality of later stages.

8. In an oil refining system, an oil and vapor separating tower having a vapor outlet at its upper end, an oil outlet at its lower end, an intermediate tangential oil and vapor inlet, an inverted conical surface beneath said inlet along which the oil entering through said inlet travels in a spiral path, baffles in said tower between said inlet and vapor outlet to retard the flow of vapor and bring it into contact with condensate and reflux liquid, and means for discharging substantial amounts of reflux liquid into the top of said tower adjacent said vapor outlet.

Signed at New York City, in the county of New York, and State of New York, this 19th day of August, A. D. 1924.

JOHN E. BELL.